W. P. PORTER.
PNEUMATIC TIRE.
APPLICATION FILED SEPT. 25, 1919.
1,394,787.
Patented Oct. 25, 1921.
3 SHEETS—SHEET 2.
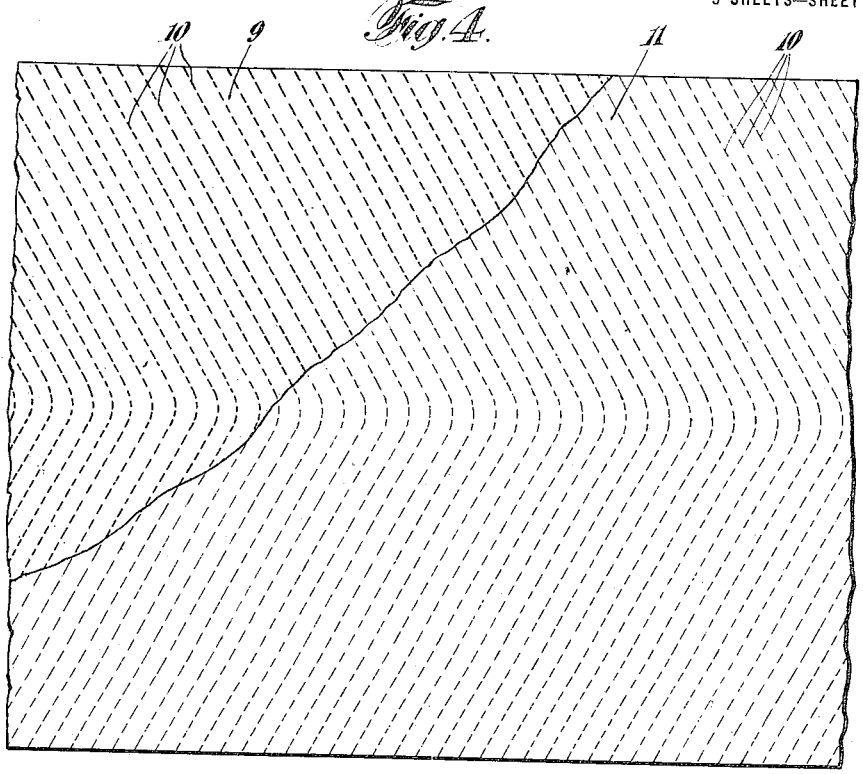
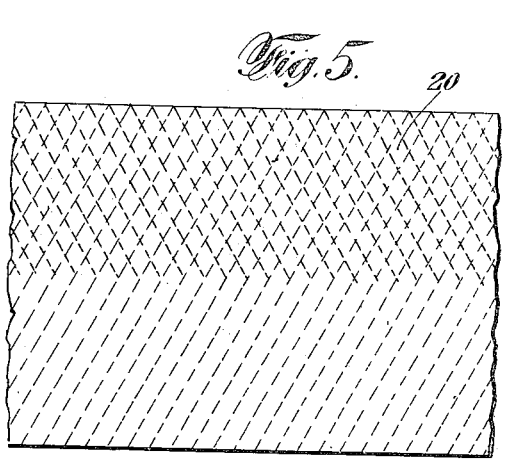
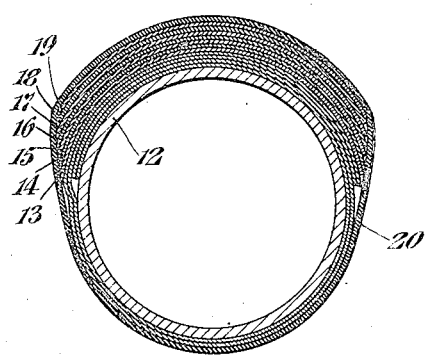

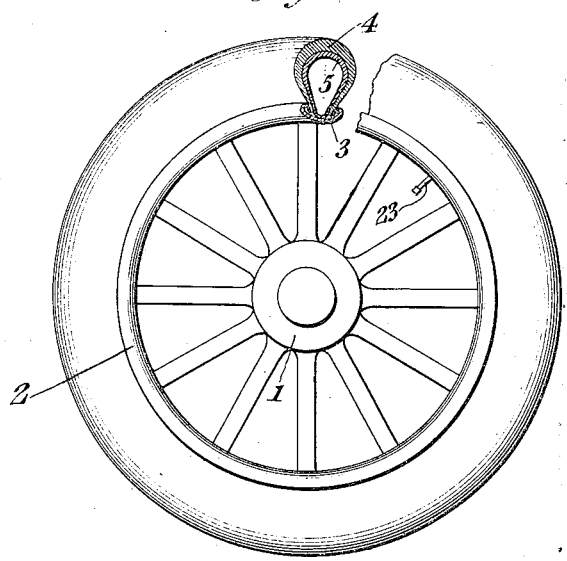
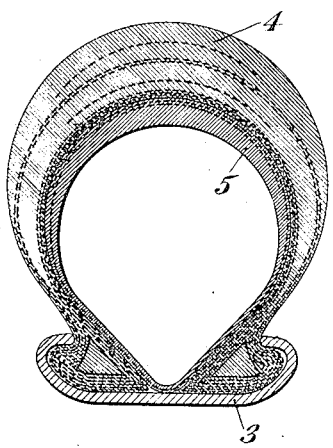
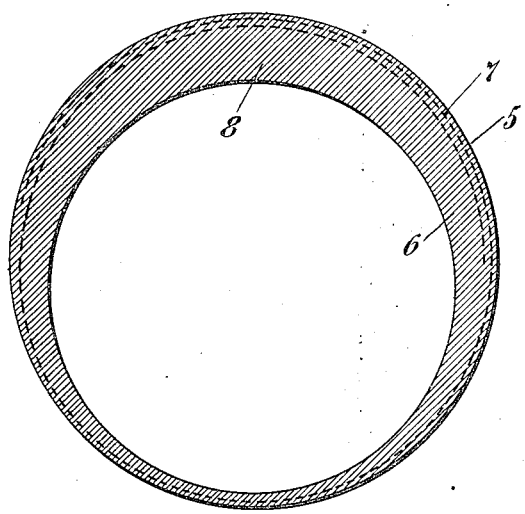

W. P. PORTER.
PNEUMATIC TIRE.
APPLICATION FILED SEPT. 25, 1919.

1,394,787.

Patented Oct. 25, 1921.
3 SHEETS—SHEET 3.

UNITED STATES PATENT OFFICE.

WINFIELD P. PORTER, OF NEW YORK, N. Y.

PNEUMATIC TIRE.

1,394,787.  Specification of Letters Patent.  Patented Oct. 25, 1921.

Application filed September 25, 1919. Serial No. 326,130.

*To all whom it may concern:*

Be it known that I, WINFIELD P. PORTER, a citizen of the United States, residing at New York, in the county of New York and State of New York, have invented a certain new and useful Improvement in Pneumatic Tires, of which the following is a specification.

My invention relates particularly to a tire of the pneumatic type which is designed to be used in connection with any type of apparatus to which pneumatic tires are applied, as, for example, automobiles, aeroplanes, bicycles, etc.

The object of my invention is to provide a pneumatic tire having many advantageous characteristics, but the object of my invention is especially to provide an inner tube for pneumatic tires which will prevent the escape of air when holes are made therein as in the case of punctures, rim cutting, side cracking, rim pinching, etc., because of the compression of the rubber maintained therein.

Furthermore, one of the objects of my invention is to provide an inner tube which will prevent the breaking of the tube when the shoe or tube is weakened or when a hole is made in the shoe, and will thus tend to prevent blowouts, rim cutting, side cracking and rim pinching, irrespective of whether the tube has compressed rubber therein or not.

Again, the object of my invention is to provide an inner tube of this character which is expansible in every direction, so that the shoe may be completely filled by the inner tube without difficulty when the tire is inflated.

Still another object of my invention is to provide an inner tube of this character in which the rubber is maintained under compression by the presence of cords or tapes which are arranged in such a manner as to permit such expansion in every direction, while at the same time retaining the compression of the rubber.

Furthermore, another object is to so arrange the belly portion of the inner tube that this portion of the tube, including the cords or tapes carried thereby, will readily fit the sharp depression which is ordinarily present in the outer periphery of the wheel or rim on which the tire is carried.

Another object is to maintain an extremely effective compression of the tread portion of the tube by locating the cords or tapes with crossed ends in the tread portion of the tube.

Again, another object is to provide a tube of this kind in which the cords or tapes maintaining the compression of the rubber or conformation of the tube are inclined in the same direction on the opposite sides of the tube so as to permit the tube to expand transversely as well as longitudinally when the tube is being inflated to fill the outer shoe.

Further objects of my invention will appear from the detailed description thereof contained hereinafter.

While my invention is capable of embodiment in many different forms, for the purpose of illustration I have shown only one form of the same in the accompanying drawings in which—

Figure 1 is a side elevation of a wheel partly in section carrying a tire containing an inner tube made in accordance with my invention;

Fig. 2 is a cross-section of the tire;

Fig. 3 is a cross-section of the inner tube;

Fig. 4 is a plan view of a portion of a sheet of rubber carrying strips of fabric, such, for example, as cords used in making the inner tubes constructed in accordance with my invention;

Fig. 5 is a side elevation of an inner tube made in accordance with my invention;

Fig. 6 is a cross-section of a mandrel showing thereon one of my tubes in the process of manufacture;

Figure 7:
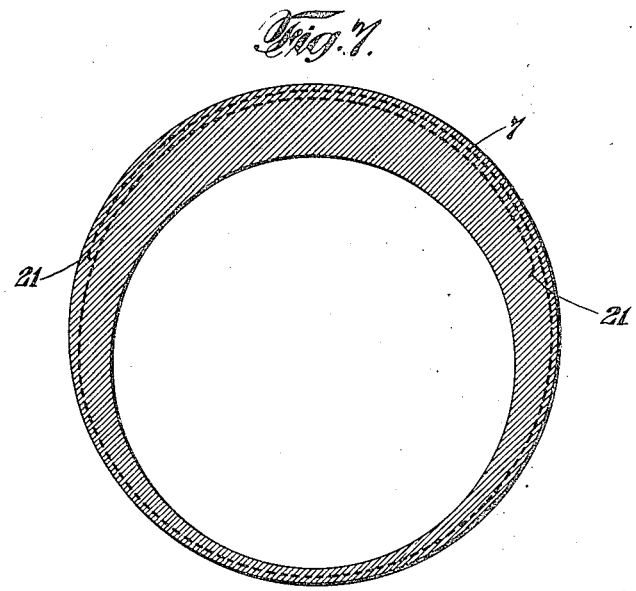
Fig. 7 is a cross-section of a modified form of the tube.

In the drawings I have shown an automobile wheel 1 having a rim 2 provided with the usual deep depression 3 in its outer periphery and arranged to carry an outer shoe 4 inclosing an inner tube 5. The inner tube 5 is comprised of a body of rubber 6 inclosing a plurality of cords 7. It will be understood, however, that instead of the cords 7 tapes of woven fabric may be used. It will be noted that the tube may be provided, if desired, with a thickened tread 8. The location of the cords 7 in the inner tube 5 will be best understood from the description of the mode of the manufacture of the tube hereinafter described and therefrom it will be seen that the cords are arranged in the shape of a V with the point or bend of the V located in the belly portion of the tube, while the two arms of the V cross over the tread of the tube, thus providing two layers of crossing cords in the tread portion of the tube. This arrangement of the cords is such that the cords are inclined in the same direction upon opposite sides of the tube as indicated in Fig. 4 so as to permit transverse expansion simultaneously with the longitudinal expansion of the tube when being inflated so as to fill every portion of the shoe 4.

While tubes of this character may be made in many different ways, I will, by way of example, describe in detail certain ways in which tubes of this character may be made. A flat sheet of unvulcanized rubber 9 wide enough to extend from the belly portion around the tread portion of the tubes with the free ends of the sheet 9 overlapping so as to completely cover the tread portion with the folded parts of the sheet, is sponged off with a solvent such as gasolene or benzol and allowed to dry for from one to two hours. A number of short cords 10, as, for example, linen cords, are now soaked in rubber cement and kneaded therein. Thereafter, they are removed and allowed to dry for from one to two hours or more until the surfaces of the same will not readily stick together. These cords are then laid upon the sheet of rubber 9 in the form of V's with the arms parallel, as indicated in Fig. 4, until the entire sheet of rubber 9 is covered. The cords 10 are then rolled slightly with any suitable roller in order to cause them to adhere to the surface of the sheet 9. I then cover the cords 10 with another sheet of unvulcanized rubber 11 of the same size and prepared in the same way as the sheet of rubber 9. The roller is then again applied so as to cause the sheet 11, cords 10 and the sheet 9 to adhere together. Thereupon, I wrap the composite sheet thus obtained around a hollow steel mandrel 12 in such a way that the sides of the sheet overlap and completely cover the tread portion of the tube with two thicknesses of the composite sheet. Thereupon, I build up upon the tread portion of the tube a thickened tread by applying a number of thicknesses of unvulcanized rubber sheets prepared in the same manner as the rubber sheet 9. These sheets may be, for example, the seven sheets 13, 14, 15, 16, 17, 18 and 19, which, as indicated in Fig. 6, are progressively narrower in width. I then wrap around the rubber layers thus formed a spiral winding of woven fabric 20. The entire structure of rubber and embedded cords is then vulcanized. After the rubber has become completely vulcanized and has cooled the fabric wrapping 20 is removed and the body of rubber is removed from the mandrel 12.

Figure 8:
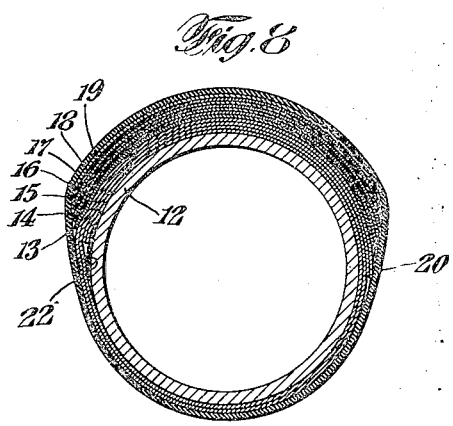
Fig. 8 shows a cross-section of the same in course of manufacture.

If it is desired to place and maintain the rubber of the tube under compression, which is advantageous in preventing the escape of air when holes are made therein, the tube after manufacture in the manner just stated, may be turned inside out, and used in the usual manner in its turned condition, it being obvious that as thus turned what was originally designed as the outside peripheral portions, due to their greater mass, will be under a state of compression, and that the rubber thus compressed will tend to close any punctures. The two ends of the tube are then beveled in a complementary way and cemented together, thus forming the complete inner tube 5 after the necessary valve 23 has been applied thereto in the usual way. As shown in Fig. 7, a modified form of the tube may be made so as to provide inturned ends 21 to the cords 7 to prevent any possibility of side cracking by locating a special strip of rubber 22 over the same in the manufacture of the tube as indicated in Fig. 8.

When the inner tube 5, which has been thus made in accordance with my invention, is inflated, the tube will not only expand in the direction of the periphery thereof, but also transversely so that every portion of the outer shoe 4 will be filled by the inner tube. This expansion in every direction is made possible by reason of the inclination of the cords 7 upon the opposite sides of the tube in the same general direction inasmuch as when the tube expands longitudinally, that is to say, in the direction of the periphery of the tube, the bodies of rubber between the cords 7 will stretch and this stretching will not be restrained nor hindered by the presence of crossed cords or fibers on the opposite sides of the tube. The expansibility of the tube in this manner is largely due to the inclination of each of the cords to a radial section of the tire, that is to say, the plane of a cross-section of the tube at this point in the tube which is determined by the radius of the wheel which carries the tire and the axle of the wheel, but is due in part also to the fact that the cords in the tube are entirely separate from one another. The inclination of the cords referred to, and to which the expansibility of the tube is largely due, may be otherwise expressed as an inclination of each of the cords at an oblique angle to the length of the tube. This expansibility is especially true of the two side portions of the tube, where, as indicated in Fig. 4, the cords run in the same general direction, and it is also peculiarly true of the belly portion of the tube where the tube carries the points or bends of the V-shaped cords which accommodate themselves very readily to the depression 3 between the rim 2 and the sides of the shoe. Also, on the tread portion of the tube there is possible a considerable degree of longitudinal expansion, as the cords are located at an angle, are separate from one another, and because of the fact that between the cords there are located bodies of rubber.

While I have described my invention above in detail, I wish it to be understood that many changes may be made therein without departing from the spirit of the same.

I claim:

1. In a pneumatic tire, a tube having an elastic wall and a series of separate strips of relatively inelastic material, an intermediate portion of each strip lying in the belly portion of the tube and with the terminal portions inclined diagonally of the tube in the same direction on opposite sides thereof.

2. In a pneumatic tire, a tube having an elastic wall and a series of separate strips of relatively inelastic material, an intermediate portion of each strip lying in the belly portion of the tube and with the terminal portions inclined diagonally of the tube in the same direction on opposite sides thereof to crossed positions in the tread of the tire.

3. In a pneumatic tire, a tube having an elastic wall composed of a body of compressed rubber confined by a plurality of separate strips of relatively inelastic material, an intermediate portion of each strip lying in the belly portion of the tube and with the terminal portions inclined diagonally of the tube in the same direction on opposite sides thereof.

4. In a pneumatic tire, a tube having an elastic wall composed of a body of compressed rubber confined by a plurality of separate strips of relatively inelastic material, an intermediate portion of each strip lying in the belly portion of the tube and with the terminal portions inclined diagonally of the tube in the same direction on opposite sides thereof to crossed position in the tread portion.

5. In a pneumatic tire, a tube having an elastic wall and a series of strips of relatively inelastic material, an intermediate portion of each strip arranged to form a V-shaped member lying in the belly portion of the tube and with the terminal portions inclined diagonally of the tube in the same direction on opposite sides thereof.

6. In a pneumatic tire, a tube having an elastic wall and a series of strips of relatively inelastic material, an intermediate portion of each strip arranged to form a V-shaped member lying in the belly portion of the tube and with the terminal portions extending to crossed positions in the tread of the tire.

7. In a pneumatic tire, a tube having an elastic wall and a series of strips of relatively inelastic material, an intermediate portion of each strip arranged to form a V-shaped member lying in the belly portion of the tube and with the terminal portions diagonally of the tube in the same direction on opposite sides thereof to crossed positions in the tread of the tire.

8. In a pneumatic tire, a tube having an elastic wall composed of a body of compressed rubber confined by strips of relatively inelastic material each having a V-shaped portion in the belly of the tire.

9. In a pneumatic tire, a tube having a continuous elastic wall, relatively inelastic material incorporated therewith in strip form, portions of said relatively inelastic material lying in the belly of the tube and the remaining portions inclined diagonally of the tube, all in the same direction on opposite sides thereof, said elastic wall being unconfined save for said relatively inelastic material.

10. In a pneumatic tire, a tube having an elastic wall, strips of relatively inelastic material incorporated therewith, a portion of each strip lying in the belly portion of the tube and terminal portions of said strips inclined diagonally of the tube in the same direction, toward the tread portion of the tube on opposite sides thereof, said elastic wall being unconfined save for said strips.

11. In a pneumatic tire, a tube having an elastic wall, strips of relatively inelastic material incorporated therewith, a portion of each strip lying in the belly portion of the tube and terminal portions of said strips inclined diagonally of the tube on opposite sides thereof in uncrossed relation toward the tread portion of the tube, said elastic wall being unconfined save for said strips.

12. In a pneumatic tire, a tube having an elastic wall, strips of relatively inelastic material incorporated therewith, a portion of each strip lying in the belly portion of the tube and terminal portions of said strips inclined in the same direction diagonally of the tube in uncrossed relation in the opposite side portions of said tube to crossed relation in the tread portion, said elastic wall being unconfined save for said strips.

In testimony that I claim the foregoing, I have hereunto set my hand this 2nd day of September, 1919.

WINFIELD P. PORTER.